United States Patent
Oh et al.

(10) Patent No.: US 8,050,909 B2
(45) Date of Patent: Nov. 1, 2011

(54) APPARATUS AND METHOD FOR POST-PROCESSING DIALOGUE ERROR IN SPEECH DIALOGUE SYSTEM USING MULTILEVEL VERIFICATION

(75) Inventors: Hyo Jung Oh, Daejeon (KR); Chung Hee Lee, Daejeon (KR); Chang Ki Lee, Daejeon (KR); Yi Gyu Hwang, Jeollabuk-do (KR); Ji Hyun Wang, Daejeon (KR); Myung Gil Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 726 days.

(21) Appl. No.: 12/153,896

(22) Filed: May 27, 2008

(65) Prior Publication Data

US 2009/0076798 A1 Mar. 19, 2009

(30) Foreign Application Priority Data

Sep. 19, 2007 (KR) ........................ 10-2007-0095457

(51) Int. Cl.
*G06F 17/27* (2006.01)
(52) U.S. Cl. ................................ 704/9; 704/257; 704/1
(58) Field of Classification Search .............. 704/1–10, 704/251, 257, 275, 276, 231, 270, 270.1
See application file for complete search history.

(56) References Cited

U.S. PATENT DOCUMENTS

| 7,403,899 B1 * | 7/2008 | Abella et al. ................. 704/275 |
| 2006/0085192 A1 | 4/2006 | Davis et al. |
| 2006/0149544 A1 | 7/2006 | Hakkani-Tur et al. |
| 2006/0247931 A1 | 11/2006 | Caskey et al. |

FOREIGN PATENT DOCUMENTS

| KR | 2005-0015586 A | 2/2005 |
| KR | 2006-0057921 A | 5/2006 |
| KR | 10-2007-0060491 A | 6/2007 |

OTHER PUBLICATIONS

Korean Office Action issued on Mar. 31, 2009 in corresponding Korean Patent Application 10-2007-0095457.
Michael McTear et al., "Handling errors and determining confirmation strategies—An object-based approach", Science Direct, Speech Communication 45 (2005), 249-269 pages, http://www.sciencedirect.com.
Sangkeun Jung et al., "Three Phase Verification for Spoken Dialog Clarification", IUI'06, Jan. 26-Feb. 1, 2006, 55-61 pages.
Korean Office Action issued on Sep. 18, 2009 in corresponding Korean Patent Application 10-2007-0095457.

* cited by examiner

*Primary Examiner* — Huyen X. Vo
(74) *Attorney, Agent, or Firm* — Staas & Halsey LLP

(57) ABSTRACT

Provided are an apparatus and method for post-processing a dialogue error in a speech dialogue system using multilevel verification, in which both of a user's current utterance and a whole dialogue flow are taken into account through the multilevel verification including speech recognition results analysis, linguistic analysis, discourse analysis and dialogue analysis. As a result, various errors that may occur in the speech dialogue system are detected, and error post-processing appropriate to a detected error type is performed, so that speech recognition errors may be reduced.

10 Claims, 2 Drawing Sheets

APPARATUS AND METHOD FOR POST-PROCESSING DIALOGUE ERROR IN SPEECH DIALOGUE SYSTEM USING MULTILEVEL VERIFICATION

CROSS-REFERENCE TO RELATED APPLICATION

This application claims priority to and the benefit of Korean Patent Application No. 2007-95457, filed Sep. 19, 2007, the disclosure of which is incorporated herein by reference in its entirety.

BACKGROUND

1. Field of the Invention

The present invention relates to an apparatus and method for post-processing a dialogue error in a speech dialogue system using multilevel verification, and more particularly, to an apparatus and method for recognizing various dialogue errors that may occur in a speech dialogue system through multilevel verification and efficiently performing post-processing of the dialogue errors.

2. Discussion of Related Art

Speech recognition technology refers to apparatuses and methods for analyzing human speech by a speech recognition machine to recognize or understand the recognized results, and the technology is applied to various areas such as telephone dialing, user identification, and control of electronic appliances.

However, generally, speech is uttered in a poor environment caused by various static and noise, and thus it is very difficult for the speech recognition machine to exactly recognize the speech to output the recognized results.

Accordingly, since the output of the currently implemented speech recognition machine usually includes errors to some extent, errors should be detected from speech recognition results amend them before final speech recognition results are output in order to apply the output to a substantial system.

Meanwhile, in methods for minimizing the errors, a method of outputting final speech recognition results by user confirmation and correction with respect to multiple values of speech recognition is disclosed in U.S. Patent No. 2006/0247931, entitled "Method and Apparatus for Multiple Value Confirmation and Correction in Spoken Dialog Systems (published Nov. 2, 2006)". Also, a method of determining speech recognition errors by combining reliability with respect to speech recognition results and reliability of mapping from user intent is disclosed in U.S. Patent No. 2006/0149544 entitled "Error Prediction in Spoken Dialog Systems (published Jul. 6, 2006)".

In addition, a method, in which erroneous portions and error types are exactly recognized through the steps of word error verification, utterance verification and slot-value verification, is disclosed by Sangkeun Jung, Cheongjae Lee and Gary Geunbae Lee in "Three Phase Verification for Spoken Dialog Clarification", International Conference on Intelligent User Interfaces, 2006. Furthermore, a method, in which errors are recognized using an acoustic confidence score based on object-based approach to verify the whole utterance, and after a dialogue is completed, or a user's previous utterance is arranged to be finally verified by the user, so that errors are recognized to be corrected, is disclosed in the paper by Michael McTear, Ian O'Neill, Philip Hanna and Xingkun Liu, "Handling Errors and Determining Confirmation Strategies—An Object-Based Approach", IEEE Transactions on Speech and Audio Processing, Vol. 45, No. 3, pp. 249-269, 2005.

However, in the conventional methods, errors in a current sentence uttered by a user are acoustically detected to correct the detected errors by a user's verification or selection, and since the speech recognition errors are detected without taking into account the whole dialogue, the user has to verify the detected errors.

SUMMARY OF THE INVENTION

The present invention is directed to an apparatus and method, in which a dialogue error type is recognized by taking into account a whole dialogue flow, as well as current utterance, through multilevel verification to perform error post-processing appropriate to the error type.

One aspect of the present invention provides a method of post-processing a dialogue error using multilevel verification, comprising: recognizing user speech to detect a speech recognition error in a sentence uttered by the user, which is obtained by the speech recognition results; linguistically analyzing the sentence uttered by the user to detect an error in the linguistic analysis results; analyzing a meaning of a discourse in the sentence uttered by the user based on a context to detect an error in the discourse analysis results; analyzing a meaning of a dialogue in the sentence uttered by the user based on a whole dialogue flow to detect an error in the dialogue analysis results; and analyzing types of the detected errors to perform error post-processing for error correction according to the corresponding error type.

Another aspect of the present invention provides an apparatus for post-processing a dialogue error using multilevel verification comprising: a speech recognition unit for recognizing user speech; a language analyzer for linguistically analyzing a sentence uttered by the user, which is obtained from the speech recognition results; a discourse analyzer for analyzing a meaning of a discourse in the sentence uttered by the user based on a context; a dialogue analysis and management unit for analyzing a meaning of a dialogue in the sentence uttered by the user based on a whole dialogue flow to control a system response process according to the dialogue analysis results; an error detection and analysis unit for detecting a speech recognition error, a linguistic analysis error, a discourse analysis error and a dialogue analysis error from the speech recognition results, the linguistic analysis results, the discourse analysis results and the dialogue analysis results, respectively, to analyze types of the detected errors; an error post-processing unit for performing post-processing for error correction according to the error types of the detected errors; and a system response unit for performing a system response process on the sentence uttered by the user according to the control of the dialogue analysis and management unit.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EMBODIMENTS

In the present exemplary embodiment, an apparatus and method for post-processing a dialogue error using multilevel verification will be described in more detail with reference to the accompanying drawings.

Figure 1:
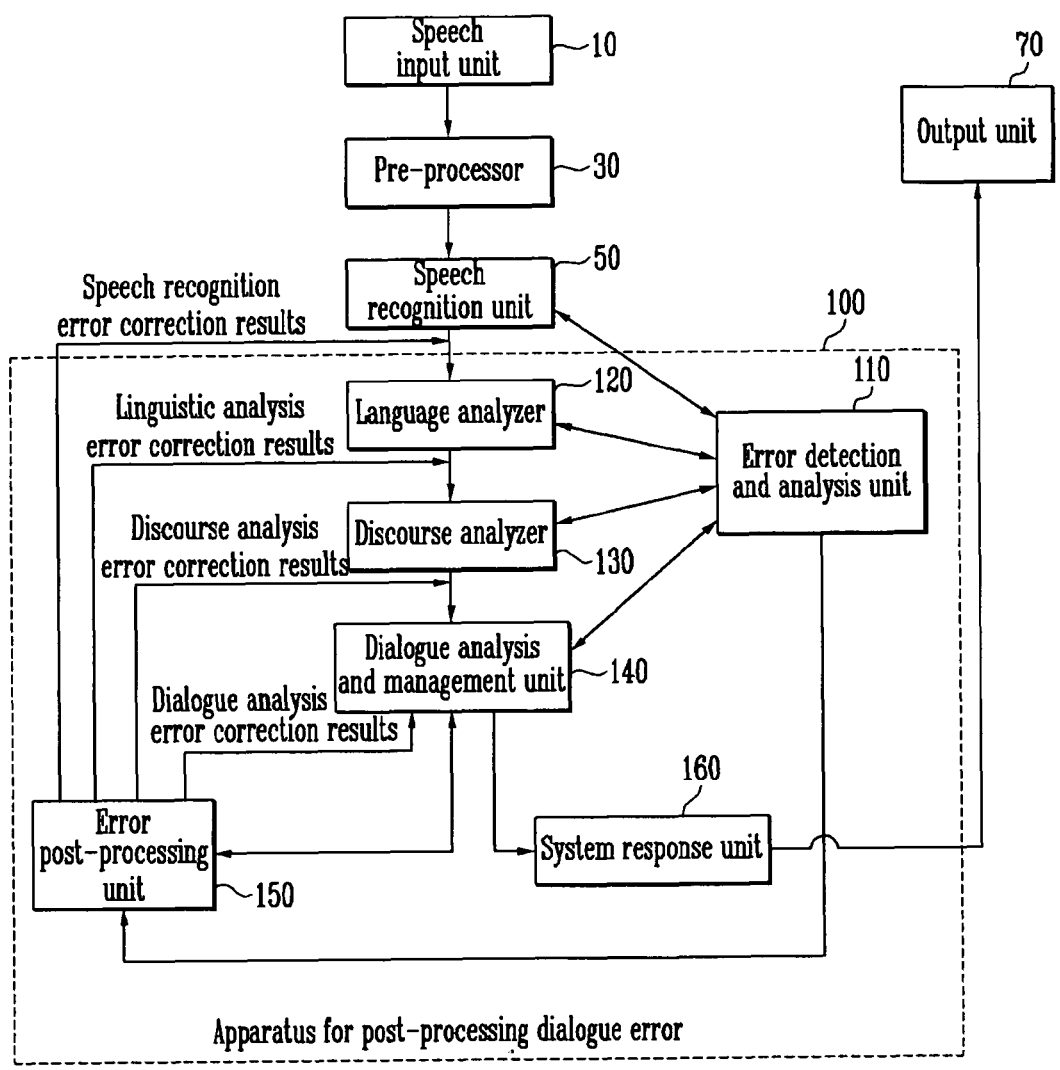
FIG. 1 is a block diagram illustrating the configuration of a speech recognition system, to which an apparatus for post-processing a dialogue error is applied, according to an exemplary embodiment of the present invention.

FIG. 1 is a block diagram illustrating the configuration of a speech recognition system including an apparatus for post-processing a dialogue error according to an exemplary embodiment of the present invention.

As illustrated in FIG. 1, the apparatus 100 for post-processing a dialogue error processes errors in speech recognition results and includes an error detection and analysis unit 110, a language analyzer 120, a discourse analyzer 130, a dialogue analysis and management unit 140, an error post-processing unit 150 and a system response unit 160.

First, a user speech signal input through a speech input unit 10 is transmitted to a speech recognition unit 50 via a pre-processor 30, and the speech recognition unit 50 extracts feature vectors from the speech signal to perform speech recognition and transmits a sentence uttered by the user obtained through the speech recognition to the apparatus 100 for post-processing a dialogue error. Here, the speech recognition unit 50 may be included in the apparatus 100 for post-processing a dialogue error depending on the circumstances.

When the sentence uttered by the user is input from the speech recognition unit 50, the error detection and analysis unit 110 of the apparatus 100 for post-processing a dialogue error detects various errors included in the sentence uttered by the user through multilevel verification, and this will be described in more detail below.

The error detection and analysis unit 110 confirms whether or not the input sentence uttered by the user includes speech recognition errors and detects the errors when the speech recognition errors are included in the sentence.

When the language analyzer 120 linguistically analyzes the sentence uttered by the user to output the linguistic analysis results, the error detection and analysis unit 110 detects errors included in the linguistic analysis results.

In addition, when the discourse analyzer 130 understands a detailed meaning of the sentence uttered by the user based on a context of a previous discourse (an uttered sentence) to output the discourse analysis results, the error detection and analysis unit 110 detects errors included in the discourse analysis results, and when the dialogue analysis and management unit 140 analyzes a meaning of a dialogue in the sentence uttered by the user based on a whole dialogue flow to output the analyzed results, the error detection and analysis unit 110 detects errors included in the dialogue analysis results.

When the speech recognition errors, linguistic analysis errors, discourse analysis errors, dialogue analysis errors, etc. are detected, the error detection and analysis unit 110 analyzes error types of the detected errors and transmits the analyzed results to the error post-processing unit 150.

When no error is detected by the error detection and analysis unit 110, the dialogue analysis and management unit 140 confirms whether or not there is an exceptional condition, in which a system response according to the dialogue analysis results cannot be logically processed (e.g., in a case of an order to record a program, no error is included in dialogue analysis results, but the TV is turned off), and when there is the exceptional condition, the system response unit 160 performs an exceptional process.

Meanwhile, the error post-processing unit 150 performs post-processing appropriate to the corresponding error type according to the error types analyzed by the error detection and analysis unit 110, and this will be described in more detail below.

When the error type corresponds to the speech recognition error, the error post-processing unit 150 corrects an incorrect word or character sequence based on reliability with respect to speech recognition of the current sentence uttered by the user and inputs the corrected results into the language analyzer 120.

For example, when initial speech recognition results are analyzed as "MBC 꺼(Turn off MBC)" and recognition reliability with respect to "꺼 (Turn off)" is very low, speech recognition errors are detected by the error detection and analysis unit 110, and the error post-processing unit 150 corrects the above sentence to read "MBC 틀어(Change the channel to MBC)" with reference to lower-ranked speech recognition results and acoustic quality to input the error correction results into the language analyzer 120.

Further, when the error type corresponds to the linguistic analysis error, the error post-processing unit 150 calculates a noise channel based on a linguistic model (not shown), re-ranks speech recognition results according to the calculated noise channel to correct the linguistic analysis error and inputs the corrected results into the discourse analyzer 130.

For example, when the linguistic analysis results correspond to "MBD 틀어(Change the channel to MBD)", an error indicating that there is no channel corresponding to MBD is detected by the error detection and analysis unit 110, and as a result, the error post-processing unit 150 corrects the sentence to read "MBC 틀어(Change the channel to MBC)" and inputs the error correction results into the discourse analyzer 130.

When the error type corresponds to the discourse analysis error, the error post-processing unit 150 corrects the discourse analysis error with reference to a context of the previous discourse (an uttered sentence) and inputs the corrected results into the dialogue analysis and management unit 140.

For example, when discourse analysis results, e.g., [User: 대조영에 누가나오지?(Who is in the program Dae Jo-yeong?)]→[System: 최수종,이덕화,정보석등이 출연합니다(Choi Su-jong, Lee Deok-hwa, Jeong Bo-seok, and others.)]→[User: 최수진 나오는프로가 뭐가 있지?(What program is Choi Su-jin in?)], are output, an error indicating that there is no program in which "최수진(Choi Su-jin)" appears is detected by the error detection and analysis unit 110. Then, since the previous utterance includes "Choi Su-jong", the error post-processing unit 150 determines that second-ranked "Choi Su-jong" is more probable than first-ranked "Choi Su-jin" to correct the sentence to read ""최수종 나오는 프로가 뭐가 있지?(What program is Choi Su-jong in?)" and inputs the error correction results into the dialogue analysis and management unit 140.

Moreover, when the error type corresponds to the dialogue analysis error, the error post-processing unit 150 corrects the dialogue analysis error based on the whole dialogue flow and transmits the error correction results to the dialogue analysis and management unit 140.

For example, when the dialogue analysis results correspond to [User: 대조영이 어디서 하지?(What channel is Dae Jo-yeong on?)]→[System: KBS1에서 지금 방송중입니다(It's on KBS1)]→ [User: 거기서 뭐해?(What's on that channel?)], an error indicating that the question "What's on that channel?" is not appropriate is detected by the error detection and analysis unit 110, and then the error post-processing unit 150 determines that a sentence reading "거기로 틀어 (Change to that channel)" sounds better in terms of the whole sentence flow to correct the sentence to read "거기로 틀어(Change to that channel)" and transmits the error correction results to the dialogue analysis and management unit 140.

That is, the error post-processing unit 150 controls the corresponding error in each step where an error is detected to be automatically and appropriately corrected, and additionally performs error detection and error post-processing based on the error correction results through multilevel verification, so that speech recognition errors are minimized to improve the accuracy of speech recognition.

When the error is automatically corrected by the control of the error post-processing unit 150 as described above, the dialogue analysis and management unit 140 performs a system response process according to the final dialogue analysis results through the system response unit 160.

When the error is not automatically corrected, the dialogue analysis and management unit 140 controls the system response unit 160, e.g., the dialogue analysis and management unit provides the user with candidate groups to be selected or transmits a message to elicit re-utterance from the user through an output unit 70. As a result, when a confirmation message or confirmation speech is input from the user, the above described error detection and the error post-processing are performed.

Figure 2:
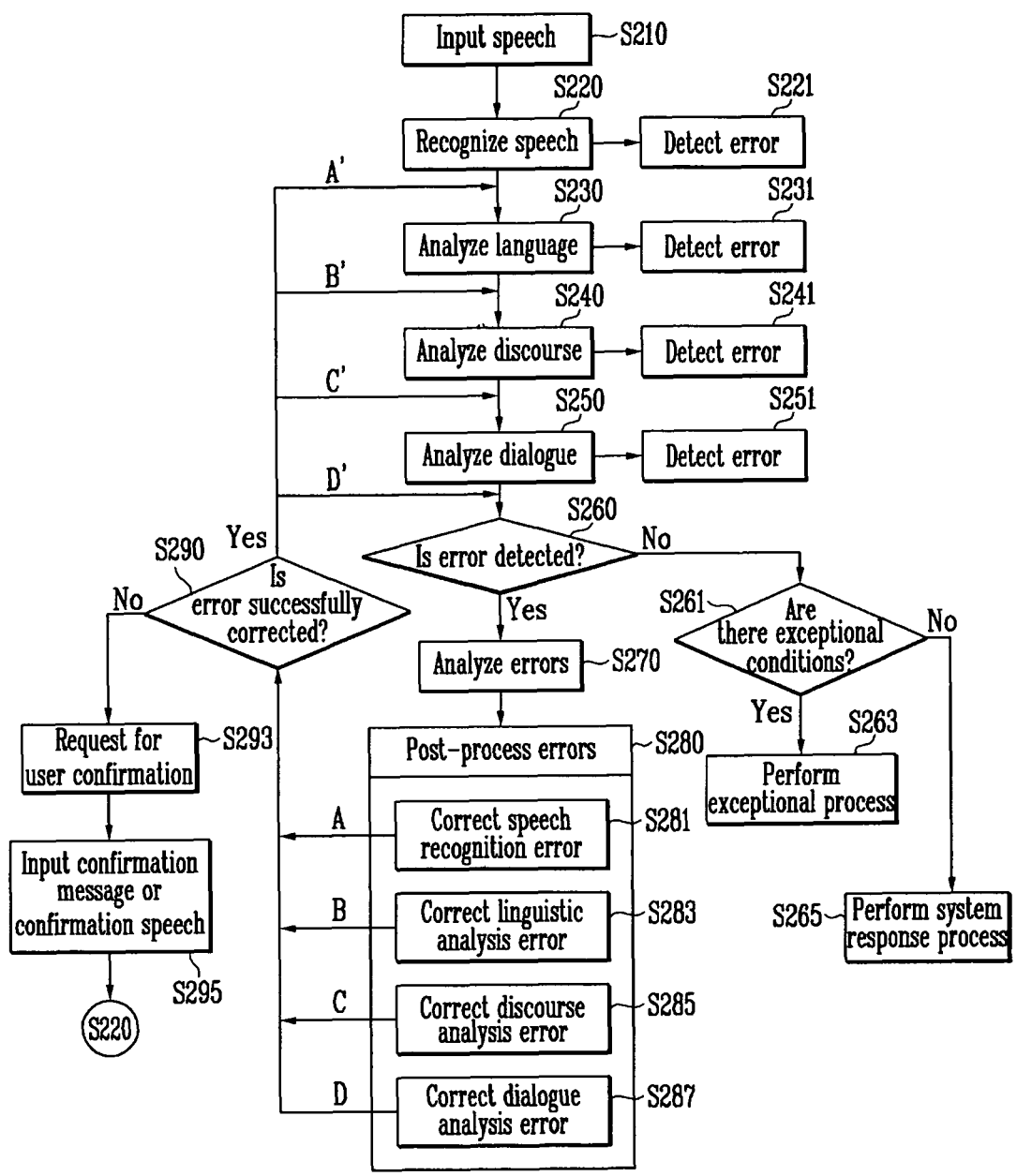
FIG. 2 is a flowchart illustrating a method of post-processing a dialogue error using multilevel verification according to an exemplary embodiment of the present invention.

FIG. 2 is a flowchart illustrating a method of post-processing a dialogue error using multilevel verification according to an exemplary embodiment of the present invention.

As illustrated in FIG. 2, when a user speech signal is input (S210), feature vectors are extracted from the input speech signal to perform speech recognition (S220) and whether or not a sentence uttered by the user, which is obtained by the speech recognition, includes speech recognition errors is confirmed. As a result, when the speech recognition errors are included, the speech recognition errors are detected (S221).

Then, the sentence uttered by the user is linguistically analyzed (S230), and errors included in the linguistic analysis results are detected (S231).

Subsequently, a discourse meaning of the sentence uttered by the user is analyzed based on a context of a previous discourse (an uttered sentence) (S240), and then errors included in the discourse analysis results are detected (S241).

Sequentially, the meaning of a dialogue in the sentence uttered by the user is analyzed with reference to the whole dialogue flow (S250), and then errors included in the dialogue analysis results are detected (S251).

Then, after whether or not at least one error is detected in each of the error detection steps (S221, S231, S241 and S251) is confirmed (S260), when no error is detected, it is confirmed whether or not there is an exceptional condition where a system response process cannot be logically processed according to the dialogue analysis results (S261).

When it is confirmed that there is the exceptional condition, an exceptional process thereof is performed (S263), and otherwise, the system response process according to the dialogue analysis results is performed (S265).

Meanwhile, when at least one error is detected in each of the error detection steps (S221, S231, S241 and S251), the types of detected errors are analyzed (S270), and error post-processing according to the corresponding error type is performed (S280). This will be described in more detail below.

When the error type corresponds to the speech recognition error, an incorrect word or character sequence is corrected based on reliability with respect to speech recognition of the sentence uttered by the user (S281), and when it is confirmed that the error is successfully corrected (S290), linguistic analysis is additionally performed based on the error detection results (S230).

When the error type corresponds to the linguistic analysis error, a noise channel is calculated based on a linguistic model, and speech recognition results are re-ranked according to the calculated noise channel to correct the linguistic analysis error (S283). Also, when it is confirmed that the linguistic analysis error is successfully corrected (S290), discourse analysis is performed again according to the error correction results (S240).

When the error type corresponds to the discourse analysis error, the discourse analysis error is corrected with reference to a context of the previous discourse (the uttered sentence) (S285), and then when it is confirmed that the discourse analysis error is successfully corrected (S290), dialogue analysis is performed again according to the error correction results (S250).

When the error type corresponds to the dialogue analysis error, the dialogue analysis error is corrected based on the whole dialogue flow (S287), and when it is confirmed that the dialogue analysis error is successfully corrected (S290), a system response process is performed according to the final dialogue analysis results, in which the errors are corrected (S260 to S265).

Meanwhile, when error correction fails according to the error post-processing step (S280), and thus the error is not automatically removed, a confirmation request such as providing candidate groups to the user in order for the user to select one candidate or to elicit re-utterance from the user is transmitted (S293). Accordingly, a confirmation message or confirmation speech is input from the user to transfer speech recognition (S220) again (S295).

That is, according to the present invention, both the current utterance and the whole dialogue flow are taken into account to recognize dialogue error types through various multilevel verification, and appropriate error post-processing thereof can be performed. Accordingly, compared with a conventional method of post-processing errors, in which errors in the currently uttered sentence only are detected to confirm the speech recognition errors by a user, speech recognition errors are minimized to improve accuracy of speech recognition in the present invention.

According to the present invention, both current utterance and the whole sentence flow are taken into account to detect various errors that may occur in a speech dialogue system through multilevel verification, and the speech recognition errors are reduced according to post-processing appropriate to the error type, so that accuracy of speech recognition can be improved.

Exemplary embodiments of the invention are shown in the drawings and described above in specific terms. However, no part of the above disclosure is intended to limit the scope of the overall invention. It will be understood by those of ordinary skill in the art that various changes in form and details may be made to the exemplary embodiments without departing from the spirit and scope of the present invention as defined by the following claims.

What is claimed is:

1. A method of post-processing a dialogue error in a speech dialogue system using multilevel verification, comprising:
   recognizing user speech to detect a speech recognition error in a sentence uttered by the user, which is obtained by the speech recognition results;
   linguistically analyzing the sentence uttered by the user to detect an error in the linguistic analysis results;
   analyzing, by a computer, a meaning of a discourse in the sentence uttered by the user based on a context to detect an error in the discourse analysis results;
   analyzing a meaning of a dialogue in the sentence uttered by the user based on a whole dialogue flow to detect an error in the dialogue analysis results; and
   analyzing types of the detected errors to perform error post-processing for error correction according to the corresponding error type,
   wherein when the error type of the detected error corresponds to a linguistic analysis error, further comprising correcting the linguistic analysis error according to a noise channel calculated based on a linguistic model to transfer the analyzing a meaning of a discourse in the sentence uttered by the user based on a context to detect an error in the discourse analysis results.

2. The method of claim 1, wherein when the error type of the detected error corresponds to a speech recognition error, further comprising:
   correcting an incorrect word or character sequence in the sentence uttered by the user to transfer the linguistically analyzing the sentence uttered by the user to detect an error in the linguistic analysis results.

3. The method of claim 1, wherein when the error type of the detected error corresponds to a discourse analysis error, further comprising:
   correcting the discourse analysis error based on a context of a previous discourse to transfer the analyzing a meaning of a dialogue in the sentence uttered by the user based on a whole dialogue flow to detect an error in the dialogue analysis results.

4. The method of claim 1, wherein when the error type of the detected error corresponds to a dialogue analysis error, further comprising:
   correcting the dialogue analysis error based on a whole dialogue flow to perform a system response process according to the final dialogue analysis results, in which the error is corrected.

5. The method of claim 1, wherein when no error is detected in the speech recognition results, the linguistic analysis results, the discourse analysis results, and the dialogue analysis results, further comprising:
   confirming whether or not there is an exceptional condition, and performing a corresponding exceptional process when it is confirmed that there is the exceptional condition.

6. An apparatus for post-processing a dialogue error in a speech dialogue system using multilevel verification, comprising:
   a computer comprising:
   a speech recognition unit for recognizing user speech;
   a language analyzer for linguistically analyzing a sentence uttered by the user, which is obtained from the speech recognition results;
   a discourse analyzer for analyzing a meaning of a discourse in the sentence uttered by the user based on a context;
   a dialogue analysis and management unit for analyzing a meaning of a dialogue in the sentence uttered by the user based on a whole dialogue flow to control a system response process according to the dialogue analysis results;
   an error detection and analysis unit for detecting a speech recognition error, a linguistic analysis error, a discourse analysis error and a dialogue analysis error from the speech recognition results, the linguistic analysis results, the discourse analysis results and the dialogue analysis results, respectively, to analyze types of the detected errors;
   an error post-processing unit for performing post-processing for error correction according to the error types of the detected errors; and
   a system response unit for performing a system response process on the sentence uttered by the user according to the control of the dialogue analysis and management unit,
   wherein when the error type of the detected error corresponds to a linguistic analysis error, the error post-processing unit corrects the language analysis error according to a noise channel calculated based on a linguistic model so that the discourse analyzer additionally performs discourse analysis according to the error correction results.

7. The apparatus of claim 6, wherein when the error type of the detected error corresponds to a speech recognition error, the error post-processing unit corrects an incorrect word or character sequence in the sentence uttered by the user so that the language analyzer additionally performs speech recognition according to the error correction results.

8. The apparatus of claim 6, wherein when the error type of the detected error corresponds to a discourse analysis error, the error post-processing unit corrects the discourse analysis error based on a context of a previous discourse so that the dialogue analysis and management unit additionally performs meaning analysis of a dialogue in the sentence uttered by the user according to the error correction results.

9. The apparatus of claim 6, wherein when the error type of the detected error corresponds to a dialogue analysis error, the error post-processing unit corrects the dialogue analysis error based on a whole dialogue flow so that the dialogue analysis and management unit performs a system response process according to the final dialogue analysis results, in which the error is corrected.

10. The apparatus of claim 6, wherein when no error is detected from the error detection and analysis unit, the dialogue analysis and management unit confirms whether or not there is an exceptional condition, and when it is confirmed that there is an exceptional condition, the system response unit performs a corresponding exceptional process.

* * * * *